Oct. 28, 1969  G. DI ROSA  3,474,738
CONVEYOR SWITCH MECHANISM
Filed April 21, 1967

INVENTOR
GAETANO DI ROSA

BY Young & Thompson
ATTORNEYS

United States Patent Office 3,474,738
Patented Oct. 28, 1969

3,474,738
CONVEYOR SWITCH MECHANISM
Gaetano Di Rosa, Pino Torinese, Italy, assignor to Soc. F.A.T.A. S.R.L., Turin, Italy, an Italian company
Filed Apr. 21, 1967, Ser. No. 632,604
Claims priority, application Italy, Feb. 16, 1967, 50,569-A/67
Int. Cl. E01b 25/06, 25/12, 25/20
U.S. Cl. 104—130
4 Claims

ABSTRACT OF THE DISCLOSURE

An element is movable transversely of a conveyor track in order to modify the movement of conveyor members along the track. The element is moved by a constant torque electric motor that has an eccentric on its drive shaft that acts through a first-class lever to move the element transversely and back during no more than one complete revoltuion of the drive shaft.

---

The present invention relates to apparatus for controlling the movement of conveyor members along a conveyor track, by moving an element transversely of the conveyor track.

In the past, movement of such elements transversely of a conveyor track has been achieved by means of motors and reduction gears. Such apparatus has the disadvantage that it is complicated and expensive.

Accordingly, it is an object of the present invention to provide such apparatus, which avoids the need for reduction gears.

Another object of the present invention is the provision of such apparatus which will be relatively simple and inexpensive to manufacture and install, dependable in operation, and rugged and durable in use.

Other objects and advantages of the present invention will become apparent from a consideration of the following description, taken in connection with the accompanying drawing, in which.

Figure 1:
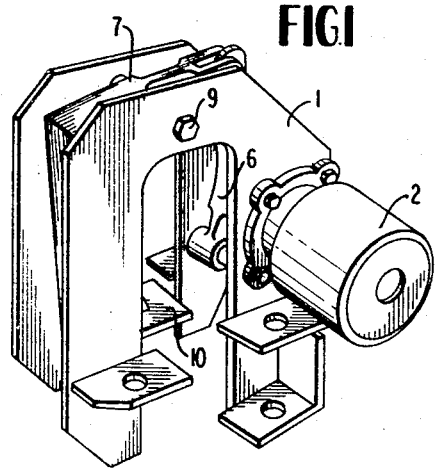
FIGURE 1 is a perspective view of control equipment according to the present invention.
Figure 2:
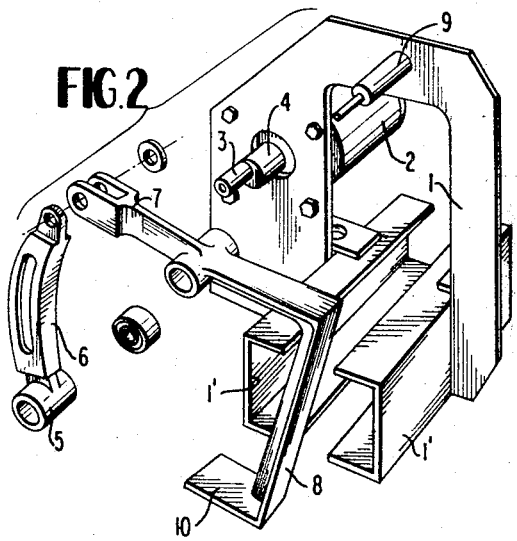
FIGURE 2 is an exploded perspective view of the structure of FIG. 1 but shown from the opposite side from FIG. 1 and showing a portion of a conveyor with which the apparatus is usable.

Referring now to the drawing in greater detail, and first to the embodiment of FIGS. 1 and 2, there is shown apparatus according to present invention, comprising a frame 1 which is secured to the tracks 1' of a power-driven conveyor which may take any of a variety of forms, for example that shown in my copending application filed under even date herewith and entitled "Conveyor with Drive Release." The tracks 1' are horizontal channel members that open toward each other and on whose lower flanges run the conveyor members or carriages (not shown). Carried by frame 1 is a constant torque electric motor 2 whose rotatable drive shaft 3 is horizontal. The operation of motor 2 is controlled by a conventional timer (not shown). Drive shaft 3 carries an eccentric 4 whose cam surface is cylindrical and is slidably encircled by a sleeve 5 at one end of an arm 6 whose other end is pivotally interconnected with the end 7 of a rocker arm 8 that acts like a first-class lever. Arm 8 is pivotally mounted on a horizontal bearing 9 carried by frame 1.

At its end opposite end 7, rocker arm 8 carries a spatular bar 10 that is generally horizontally disposed at a level a little higher than the upper flanges of tracks 1'.

In operation, constant torque motor 2 is actuated, to rotate its drive shaft 3 through a partial revolution so that cam 4 causes arm 6 to swing, thereby rocking arm 8 to the extent necessary to bring bar 10 above the midplane of the tracks 1'. In this position, bar 10 can be struck by a portion of a conveyor member or carriage as in the above-identified copending application, thereby disabling the drive of that conveyor member, or performing some other function relevant to the travel of the conveyor member.

Under the influence of the timer, the arm 8 is rocked only to operative position and stops. Upon subsequent action of the timer, motor 2 is reversed and rocker arm 8 is swung in the opposite direction until the bar 10 is out of the path of any projecting portion of the conveyor members.

Figure 4:
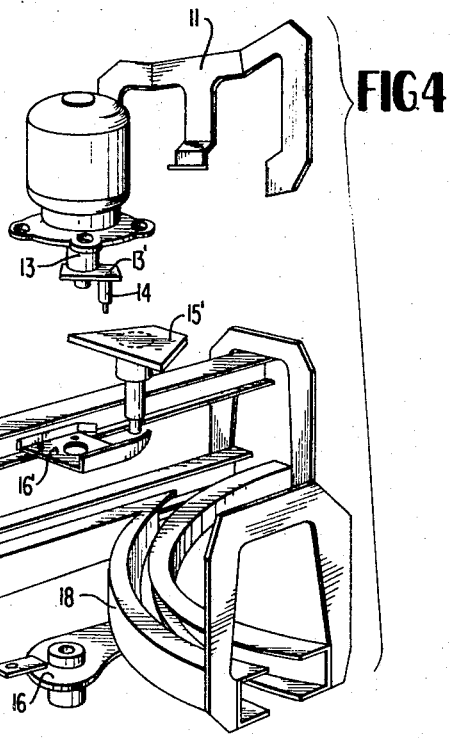
FIGURE 4 is an exploded perspective view of the embodiment of FIG. 3 but seen from above.
Figure 3:
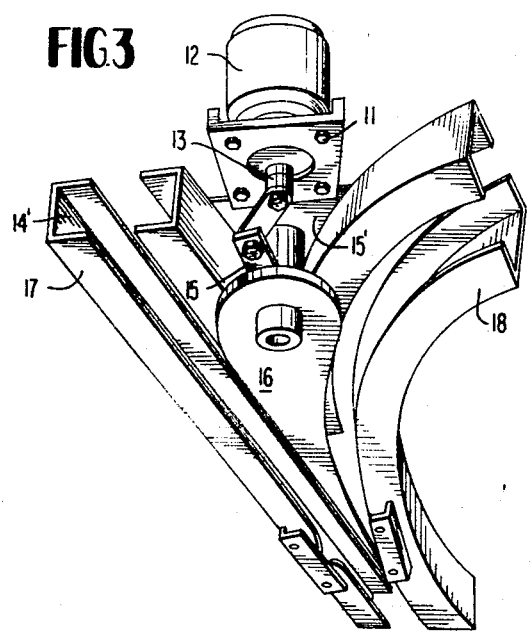
FIGURE 3 is a perspective view of a second embodiment of structure according to the present invention from below.

The embodiment of FIGS. 3 and 4 is concerned with a switch for directing a conveyor member from one track section to another.

To this end, there is provided a bracket assembly 11 which supports a constant torque electric motor 12 having a vertical drive shaft 13 and a timer (not shown) as in the previous embodiment. An eccentric arm 13' extends horizontally from drive shaft 13 and carries a downwardly depending pin 14 which is pivotally interconnected with an arm 15 rigid with a switch member 16. Switch member 16 is disposed between the intersection of two trackways 17 and 18, each trackway 17, 18 being comprised of a pair of horizontal channels 14' which may be the same as in FIGS. 1 and 2. A bracket plate 15' rests on and is secured to the upper flanges of trackways 17 and 18 adjacent their junction and has a downwardly depending spindle on which switch member 16 is pivotally mounted for horizontal swinging movement about a vertical axis. Pin 14 is pivotally interconnected with arm 15 at a point spaced a substantial distance from this vertical axis. An upper rail 19 is disposed above trackway 17 and supports trackway 17 by means of hangers 20. Rail 19 carries a bracket 16' which engages and holds the upper end of motor 12.

In operation, when electric motor 12 is actuated, its timer ensures that drive shaft 13 will be turned only to the extent necessary to swing switch member 16 from one trackway 17, 18 to the other, thereby to shunt the conveyor members or carriages by means of their downwardly depending portions selectively to either of trackways 17 and 18. Again, the motor timer can reverse the direction of rotation of drive shaft 13 to switch the member 16 back to the other side.

From a comparison of the two species disclosed above, it will be seen that in each case there is a constant torque electric motor having a drive shaft having an eccentric member thereon, the eccentric member being swingably connected with a first-class lever which is the rocker arm 8 in FIG. 2 and the switch member 16 in FIG. 3, thereby to move an element transversely of the conveyor tracks in order to alter the movement of conveyor members on the tracks.

It will also be noted that only a partial revolution of the drive shaft suffices to produce the necessary movement, and that there is accordingly no gear reduction necessary. The element thus moves transversely of the track and back during no more than one complete revolution of the drive shaft.

From a consideration of the foregoing disclosure, therefore, it will be evident that all of the initially recited objects of the present invention have been achieved.

Although the present invention has been described and illustrated in connection with preferred embodiments, it Having described my invention, I claim:

1. In combination with a conveyor track along which conveyor members are adapted to move, an element movable transversely of the track to alter the movement of conveyor members along the track, and means for moving said element transversely of the track, said means comprising a constant torque electric motor having a drive shaft, and means interconnecting said drive shaft and said element for movement of said element transversely of the track and back during no more than one complete revolution of the drive shaft.

2. Apparatus as claimed in claim 1, said moving means comprising an eccentric carried by the drive shaft.

3. Apparatus as claimed in claim 2, and a rocking arm on one end of which said element is carried, and a link connected at one end to the other end of the rocking arm and at its other end to said eccentric.

4. Apparatus as claimed in claim 2, said element comprising a conveyor switch, means mounting the switch for horizontal swinging movement about an upright axis, and means pivotally interconnecting said eccentric and said switch at a point spaced a substantial distance from said upright axis.

References Cited

UNITED STATES PATENTS

| | | | |
|---|---|---|---|
| 1,253,800 | 1/1918 | English | 104—130 |
| 3,223,048 | 12/1965 | Gorjanc | 104—130 |

ARTHUR L. LA POINT, Primary Examiner

DANIEL F. WORTH III, Assistant Examiner

U.S. Cl. X.R.

246—262